(12) United States Patent
Isogai et al.

(10) Patent No.: US 7,428,892 B2
(45) Date of Patent: Sep. 30, 2008

(54) ELECTRONICALLY CONTROLLED THROTTLE VALVE SYSTEM

(75) Inventors: Tomiharu Isogai, Obu (JP); Hiroshi Tanimura, Kariya (JP)

(73) Assignees: Aisan Kogyo Kabushiki Kaisha, Obu (JP); Denso Corporation, Kariya (JP)

( * ) Notice: Subject to any disclaimer, the term of this patent is extended or adjusted under 35 U.S.C. 154(b) by 0 days.

(21) Appl. No.: 11/515,991

(22) Filed: Sep. 6, 2006

(65) Prior Publication Data

US 2007/0084439 A1 Apr. 19, 2007

(30) Foreign Application Priority Data

Oct. 14, 2005 (JP) .............................. 2005-299887

(51) Int. Cl.
*F02D 11/10* (2006.01)
*F16K 31/02* (2006.01)
*F16K 1/36* (2006.01)

(52) U.S. Cl. .................. 123/399; 123/337; 251/305

(58) Field of Classification Search ................ 123/336, 123/337, 399, 407; 251/205, 129.11, 305; 29/890.12, 890.127
See application file for complete search history.

(56) References Cited

U.S. PATENT DOCUMENTS

| | | | |
|---|---|---|---|
| 2,153,605 A | | 4/1939 | Williams |
| 4,915,074 A | * | 4/1990 | Arai ........................... 123/399 |
| 5,177,866 A | * | 1/1993 | Bennett et al. ......... 29/890.127 |
| 6,188,078 B1 | * | 2/2001 | Bell et al. ................. 250/559.1 |
| 6,240,899 B1 | * | 6/2001 | Yamada et al. .............. 123/396 |
| 6,860,466 B2 | | 3/2005 | Sakurai et al. |
| 2002/0092998 A1 | | 7/2002 | Torii et al. |
| 2004/0262559 A1 | | 12/2004 | Shibata et al. |
| 2007/0069170 A1 | * | 3/2007 | Aoki ..................... 251/129.11 |

FOREIGN PATENT DOCUMENTS

| | | |
|---|---|---|
| DE | 1 212 363 | 9/1966 |
| DE | 34 28 001 A1 | 1/1986 |
| DE | 42 44 443 C2 | 7/1994 |
| DE | 197 40 580 A1 | 3/1999 |
| DE | 693 21 419 T2 | 4/1999 |
| DE | 101 61 130 A1 | 7/2003 |
| DE | 10 2004 030 568 A1 | 1/2005 |
| EP | 1 544 438 A2 | 6/2005 |
| JP | B2 3364873 | 9/1998 |
| JP | A 2004-251407 | 9/2004 |

* cited by examiner

*Primary Examiner*—Willis R. Wolfe, Jr.
*Assistant Examiner*—Johnny H. Hoang
(74) *Attorney, Agent, or Firm*—Oliff & Berridge, PLC

(57) ABSTRACT

In an electronically controlled throttle valve system, a case of a DC motor and a valve housing forming a throttle body are mutually different in material and shape. Specifically, the valve housing is made of synthetic resin easy to be deformed and the case is made of metal hard to be deformed as compared with synthetic resin. An elastic body formed of a nearly annular metal plate spring is mounted between the DC motor and the valve housing. The elastic body includes a plate spring base part having a larger contact area with respect to a contacted portion and a plurality of tabs having a smaller contact area with respect to the contacted portion. The plate spring base part is in contact with the valve housing made of synthetic resin and each tab is in contact with the metal case.

26 Claims, 13 Drawing Sheets

ELECTRONICALLY CONTROLLED THROTTLE VALVE SYSTEM

BACKGROUND OF THE INVENTION

1. Field of the Invention

The present invention relates to an electronically controlled throttle valve system adapted to actuate a throttle valve with an actuator such as an electric motor.

2. Description of Related Art

One of conventional systems of the above type is disclosed in Japanese Patent No. 3364873 for example. This system includes a throttle valve, an actuator for actuating the throttle valve, and a throttle body which houses and supports those throttle valve and actuator. An output-side end (base end) of the actuator is fixed to the throttle body through a support means. A non-output-side end (free end) of the actuator is supported to the throttle body through an elastic body. With such structure, both ends of the actuator are supported to the throttle body, thus effectively enhancing vibration resistance. The above patent mentions a coil spring, a wave washer, and an O-ring as examples of the elastic body.

In the electronically controlled throttle valve system mentioned above, however, the elastic body interposed between the actuator and the throttle body only has relatively small contact areas with the actuator and the throttle body respectively. Thus, contact pressure exerted on such small contact areas would be relatively large. Accordingly, in the case where the actuator has a metal case and the throttle body is made of resin, the resin throttle body tends to cause creep deformation. This may degrade the vibration resistance.

BRIEF SUMMARY OF THE INVENTION

The present invention has been made in view of the above circumstances and has an object to provide an electronically controlled throttle valve system capable of preventing an actuator or a throttle body from causing creep deformation owing to an elastic body interposed therebetween.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided an electronically controlled throttle valve system comprising: a throttle valve; an actuator for actuating the throttle valve and which includes a case, a throttle body which houses and supports the throttle valve and the actuator, the case of the actuator and the throttle body being made of mutually different materials; and an elastic body mounted between the case of the actuator and the throttle body; wherein the elastic body includes a contact portion which is in contact with the case of the actuator and another contact portion which is in contact with the throttle body, one of the contact portions is larger in contact area than the other one, and the contact portion having a larger contact area is in contact with one of the case and the throttle body, which is made of a material easy to be deformed, and the other contact portion having a smaller contact area is in contact with the other one of the case and the throttle body, which is made of a material hard to be deformed.

According to another aspect, the present invention provides an electronically controlled throttle valve system comprising: a throttle valve; an actuator for actuating the throttle valve and which includes a case; a throttle body which houses and supports the throttle valve and the actuator; and an elastic body mounted between the case of the actuator and the throttle body; wherein the elastic body includes a contact portion which is in contact with the case of the actuator and another contact portion which is in contact with the throttle body, one of the contact portions is larger in contact area than the other one, the contact portion having a larger contact area is in contact with one of the case and the throttle body, which is formed in a shape easy to be deformed, and the other contact portion having a smaller contact area is in contact with the other one of the case and the throttle body, which is formed in a shape hard to be deformed.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

First Embodiment

A detailed description of a first preferred embodiment of an electronically controlled throttle valve system embodying the present invention will now be given referring to the accompanying drawings.

Figure 1:
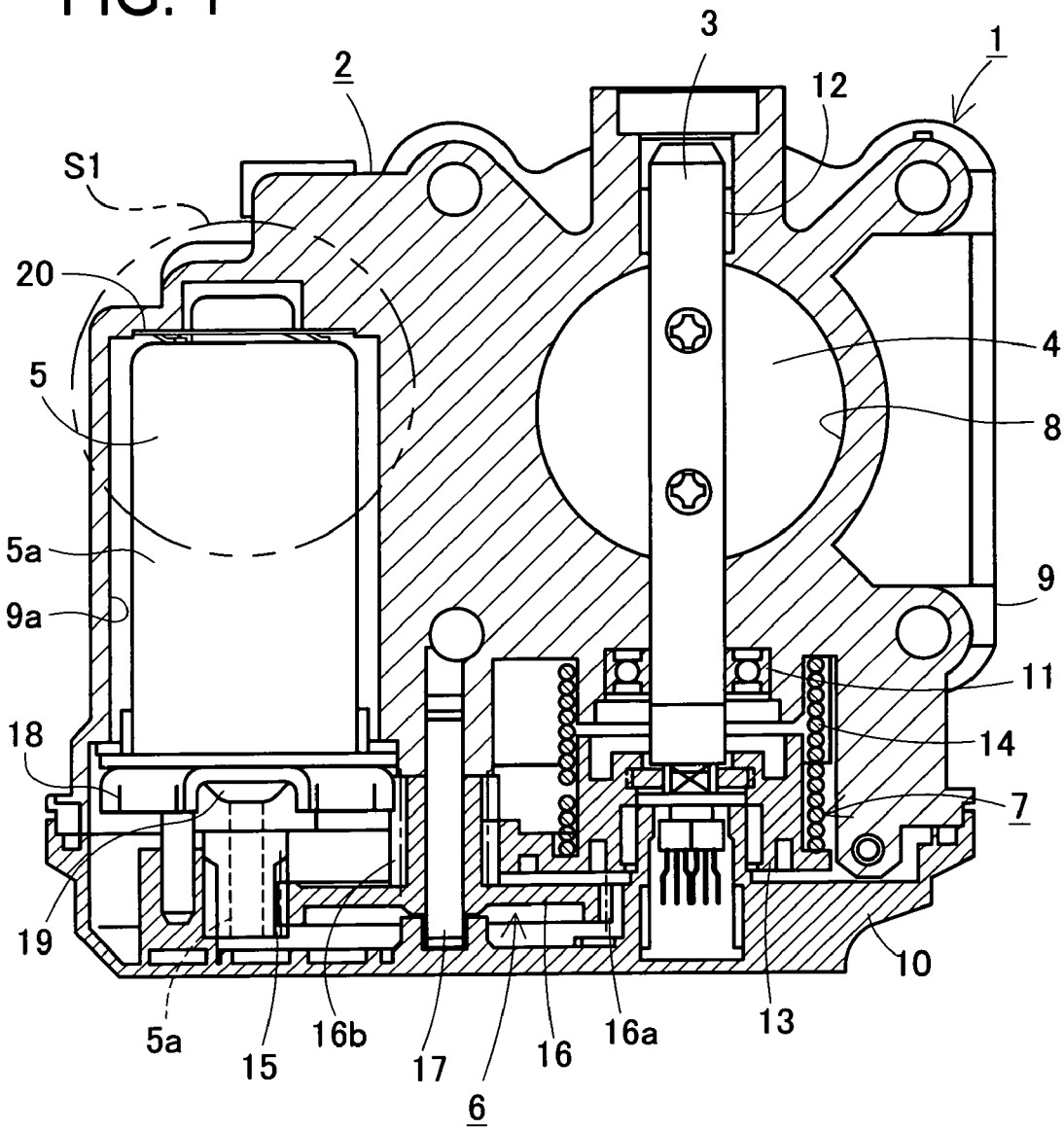
FIG. 1 is a sectional plan view of an electronically controlled throttle valve system in a first embodiment.

FIG. 1 is a plan view of an electronically controlled throttle valve system 1. This throttle valve system 1 includes a throttle body 2, a throttle shaft 3, a throttle valve 4, a DC motor 5, a speed reduction mechanism 6, and an opener mechanism 7.

In the present embodiment, the throttle body 2 includes a valve housing 9 made of synthetic resin and formed with a bore 8 which will be communicated with an intake passage (not shown) of an engine and an end frame 10 made of synthetic resin and placed closing an open end of the valve housing 9. The throttle shaft 3 and the throttle valve 4 are housed and supported in the valve housing 9. In other words, the throttle shaft 3 is placed across the bore 8 so that both ends of the shaft 3 are rotatably supported in the valve housing 9 through bearings 11 and 12. The throttle valve 4 is secured to the throttle shaft 3 with screws and placed in the bore 8.

Figure 2:
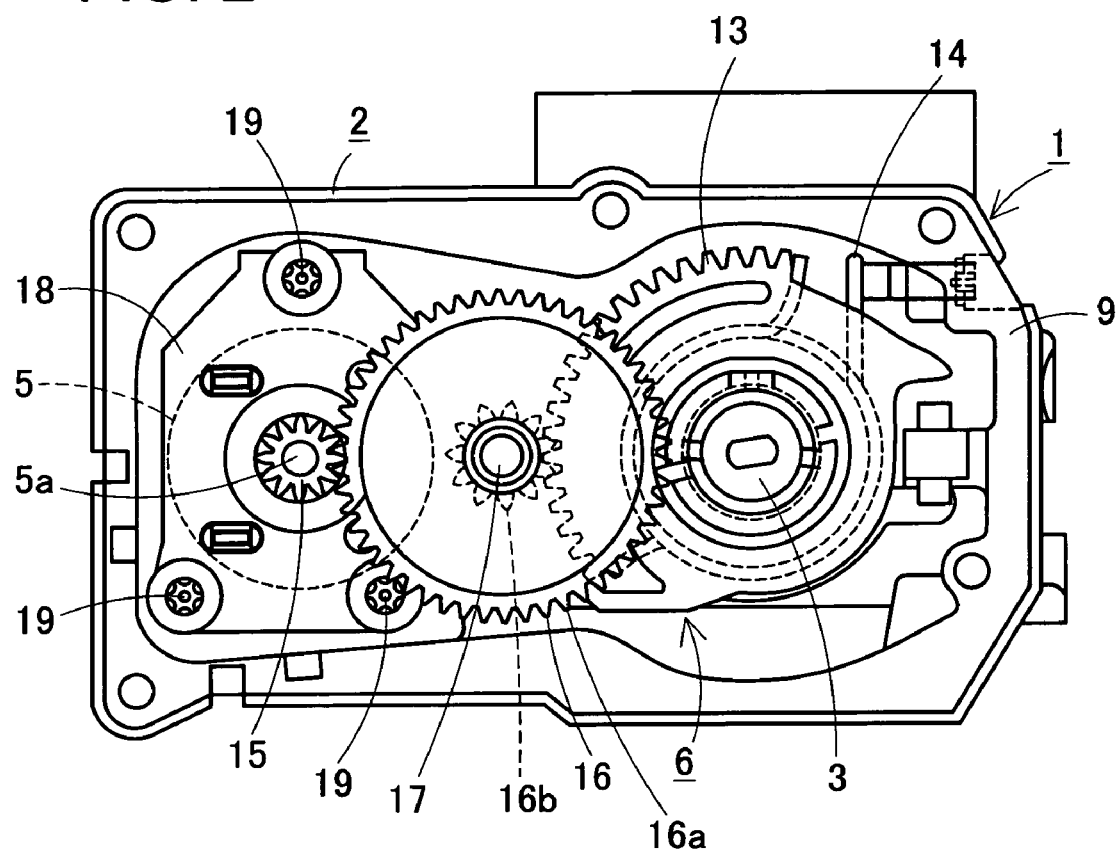
FIG. 2 is a front view of a throttle body from which an end frame has been detached.

FIG. 2 is a front view of the valve housing 9, showing a state where the end frame 10 has been detached from the throttle body 2. A throttle gear 13 is fixed to one end of the throttle shaft 3. A return spring 14 is provided between the throttle gear 13 and the valve housing 9 to bias the throttle valve 4 toward a closed position. The return spring 14 is an element constituting the opener mechanism 7.

In the present embodiment, the DC motor 5 corresponds to the actuator of the present invention, which is housed and supported in the valve housing 9. The DC motor 5 is connected to the throttle shaft 3 through the speed reduction mechanism 6 for actuating the throttle valve 4 toward an open position. Specifically, a motor gear 15 is fixed on an output shaft 5b of the DC motor 5. The motor gear 15 is connected to the throttle gear 13 through an intermediate gear 16. This intermediate gear 16 is a double gear integrally configured of a large-diameter gear 16a and a small-diameter gear 16b, which is rotatably supported in the valve housing 9 with a pin shaft 17. The large-diameter gear 16a is engaged with the motor gear 15, while the small-diameter gear 16b is engaged with the throttle gear 13.

Upon actuation of the DC motor 5 by energization, from a full closed position of the throttle valve 4 shown in FIG. 1, the output shaft 5b is rotated in a normal direction, thereby rotating the motor gear 15. This rotation is reduced in speed through the intermediate gear 16 and then transmitted to the throttle gear 13. Accordingly, the throttle shaft 3 and the throttle valve 4 are rotated against the biasing force of the return spring 14, opening the bore 8. The throttle valve 4 is thus opened. Further, in order to hold the throttle valve 4 at a certain opening degree, the DC motor 5 is energized to generate torque, which is transmitted as a holding force to the throttle shaft 3 and the throttle valve 4 through the motor gear 15, the intermediate gear 16, and the throttle gear 13 in order. When this holding force becomes equal to the biasing force of the return spring 14, the throttle valve 4 will be held at the certain opening degree.

Here, a structure of mounting the DC motor 5 in the valve housing 9 of the throttle body 2 will be explained below. The DC motor 5 is made up of a metal case 5a in which an electric mechanism including a stator, a rotator, and others is housed. As shown in FIGS. 1 and 2, the DC motor 5 is fixedly housed in a cavity 9a formed in the valve housing 9. Specifically, an output-side end (base end) of the DC motor 5 is fixed to the valve housing 9 with a bracket 18 and screws 19. A non-output-side end (free end) of the DC motor 5 is supported in the valve housing 9 through an elastic body 20. Both ends of the DC motor 5 are supported in the throttle body 2 (the valve housing 9) by such mounting structure to prevent wobbling of the DC motor 5 in the valve housing 9.

Figure 3:
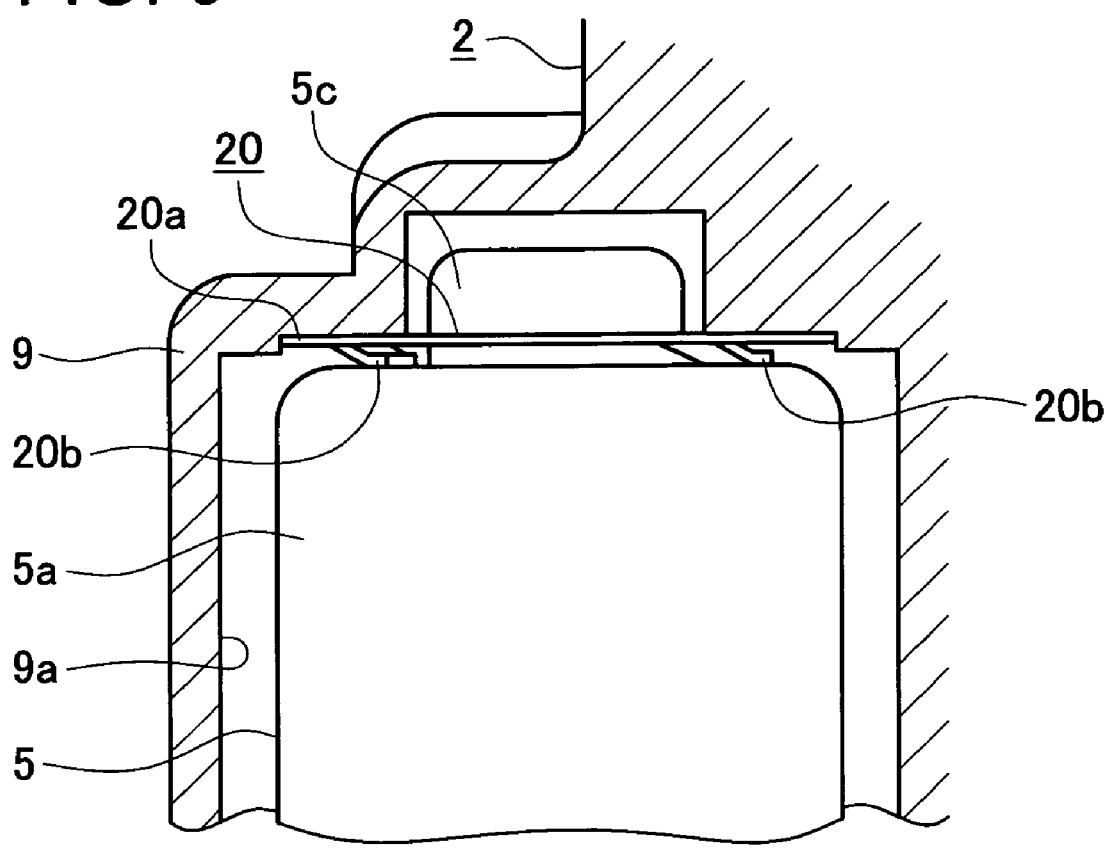
FIG. 3 is a sectional enlarged view of part of the system surrounded by a chain double-dashed circular line in FIG. 1.

FIG. 3 is a sectional enlarged view of part of the throttle valve system 1 surrounded by a chain double-dashed circular line in FIG. 1. As mentioned above, the valve housing 9 is made of resin and the case 5a of the DC motor 5 is made of metal. In the present embodiment, therefore, the valve housing 9 and the case 5a are different in material and shape. The elastic body 20 is mounted between the case 5a and the valve housing 9 so that the elastic body 20 is fitted on a projection 5c formed at the free end of the case 5a.

Figure 4:
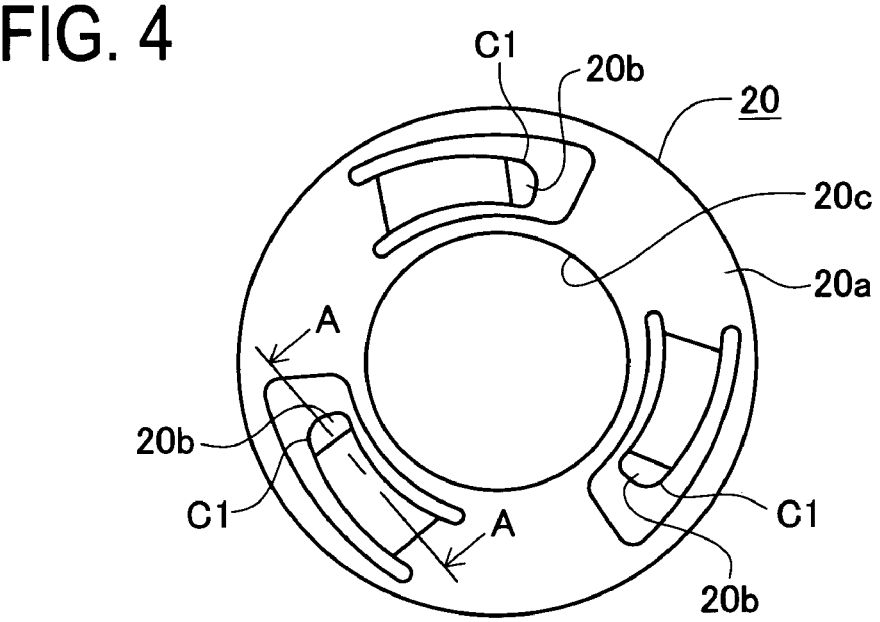
FIG. 4 is a plan view of an elastic body.
Figure 5:
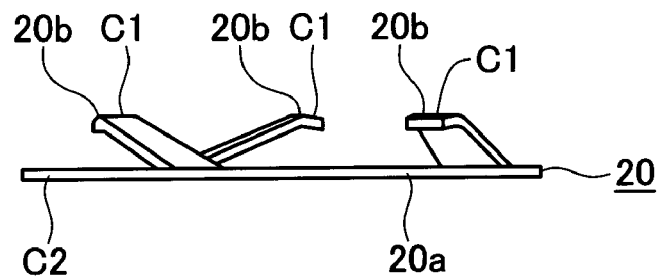
FIG. 5 is a front view of the elastic body.
Figure 6:
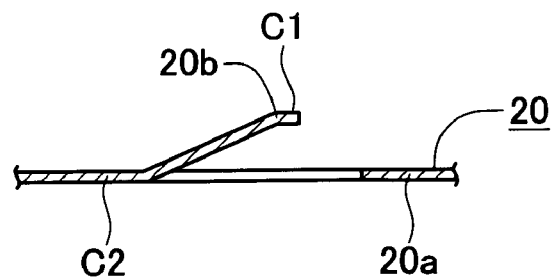
FIG. 6 is a sectional view taken along a line A-A of FIG. 4.

FIG. 4 is a plan view of the elastic body 20. FIG. 5 is a front view of the elastic body 20. FIG. 6 is a sectional view taken along a line A-A of FIG. 4. In the present embodiment, the elastic body 20 is formed of a plate spring member of a nearly annular shape. The elastic body 20 includes a plurality (three in the present embodiment) of first contact portions C1 which are held in contact with the case 5a of the DC motor 5 and a second contact portion C2 which are held in contact with the valve housing 9. Of those contact portions C1 and C2, the second contact portion C2 is designed to have a larger contact area than each first contact portion C1. In other words, the second contact portion C2 having a larger contact area is formed of a plate spring base part 20a of a nearly annular shape, some portions of which are cut out in a near U-shape, leaving a plurality of tongue-shaped pieces inside. Each piece is bent as a tab 20b serving as the first contact portion C1 having a smaller contact area. The plate spring base part 20a includes a central opening 20c corresponding to the projection 5c of the case 5a. As shown in FIGS. 5 and 6, each tongue-shaped piece is bent to protrude upward from the surface of the plate spring base part 20a and provide an angular tip part. The tab 20b corresponds to the tip part of the tongue-shaped piece. The tabs 20b are circumferentially arranged so that respective leading ends are oriented in the same direction as shown in FIG. 4. In the present embodiment, the elastic body 20 is produced by press working. The elastic body 20 is mounted as shown in FIG. 3 so that the plate spring base part 20a having a larger contact area is in contact with the valve housing 9 made of synthetic resin which is a material easy to be deformed and each tab 20b having a smaller contact area is in contact with the case 5a made of metal which is a material hard to be deformed. To be precise, a bend of each tab 20b is formed as a round corner, which makes contact with the case 5a so that each tab 20b is supported on the case 5a at that round corner and the leading end of each tab 20b is maintained out of contact with the case 5a. This makes it possible to prevent each tab 20b from scratching the case 5a, allowing each tab 20b to smoothly slide thereon.

According to the electronically controlled throttle valve system 1 in the present embodiment described above, since the elastic body 20 is mounted between the valve housing 9 of the throttle body 2 and the case 5a of the DC motor 5, the occurrence of wobbling between the throttle body 2 and the DC motor 5 can be prevented.

Here, the elastic body 20 including the tabs 20b and the plate spring base part 20a is arranged so that the plate spring base part 20a having a larger contact area is in contact with the housing 9 made of resin which is a material easy to be deformed and each tab 20b having a smaller contact area is in contact with the case 5a made of metal which is a material hard to be deformed. Accordingly, each tab 20b having a smaller contact area exerts larger contact pressure on a contacted portion of the case 5a than the plate spring base part 20a having a larger contact area. However, since the contacted portion is part of the metal case 5a made of a material hard to be deformed, deformation of the contacted portion can be prevented. On the other hand, the plate spring base part 20a having a larger contact area exerts smaller contact pressure on the valve housing 9, compared with each tab 20b having a smaller contact area. Although a contacted portion is part of the valve housing 9 made of synthetic resin which is a material easy to be deformed, deformation of the contacted portion can be prevented. Consequently, the elastic body 20 seated between the DC motor 5 and the throttle body 2 can prevent the occurrence of creep deformation of the valve housing 9 (throttle body 2) made of synthetic resin.

In the present embodiment, furthermore, the elastic body 20 is integrally produced by only press working on a plate spring. The elastic body 20 can thus be manufactured at relatively low cost.

Second Embodiment

A second embodiment of the electronically controlled throttle valve system of the present invention will be described referring to the accompanying drawings.

In each of the embodiments mentioned below, similar or identical components to those in the first embodiment are given the same reference signs and respective explanations are not repeated. Accordingly, the following explanation will be made focusing on different structures from those in the first embodiment.

Figure 7:
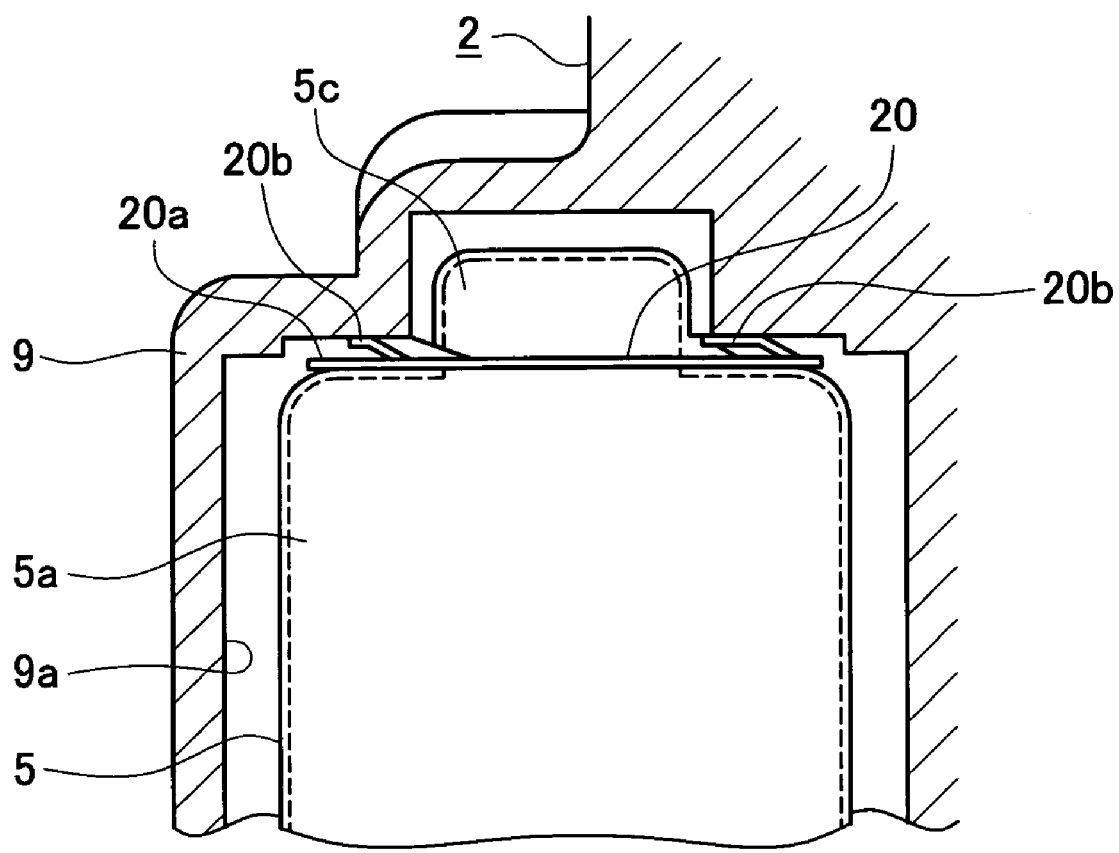
FIG. 7 is a sectional enlarged view, following FIG. 3, of a system in a second embodiment.

The present embodiment differs from the first embodiment in the structures of the valve housing 9 and the case 5a of the DC motor 5 and the orientation of the elastic body 20. FIG. 7 is a sectional enlarged view, following FIG. 3, of a system in the present embodiment. In the present embodiment, the valve housing 9 and the case 5a of the DC motor 5 are made of the same material (e.g. synthetic resin or aluminum), but different in thickness. Specifically, although the valve housing 9 and the case 5a are made of the same material, the case 5a is shaped to have a thin wall and the valve housing 9 is shaped to have a thick wall. Of both components 5a and 9, accordingly, the case 5a is formed in a shape easy to be deformed and the valve housing 9 is formed in a shape hard to be deformed. Considering respective structures, the elastic body 20 is placed in a reverse orientation from that in the first embodiment, that is, the plate spring base part 20a of the elastic body 20 is in contact with the case 5a and each tab 20b is in contact with the valve housing 9. In other words, as shown in FIG. 7, the plate spring base part 20a having a larger contact area is in contact with the thin case 5a of a shape easy to be deformed, each tab 20b having a smaller contact area is in contact with the thick valve housing 9 of a shape hard to be deformed.

In the present embodiment, consequently, each tab 20b having a smaller contact area exerts larger contact pressure on the contacted portion of the valve housing 9, compared with the plate spring base part 20a having a larger contact area. However, since the contacted portion with each tab 20b is part of the thick valve housing 9 of a shape hard to be deformed, its deformation can be avoided. On the other hand, the plate spring base part 20a having a larger contact area exerts smaller contact pressure on the case 5a of a shape easy to be deformed, compared with each tab 20b having a smaller contact area. Accordingly, although the contacted portion with the plate spring base part 20a is part of the thin case 5a easy to be deformed, its deformation can be avoided. The elastic body 20 mounted between the DC motor 5 and the throttle body 2 can prevent the occurrence of creep deformation of the thin case 5a.

Third Embodiment

A third embodiment of the electronically controlled throttle valve system of the present invention will be described referring to the accompanying drawings.

Figure 8:
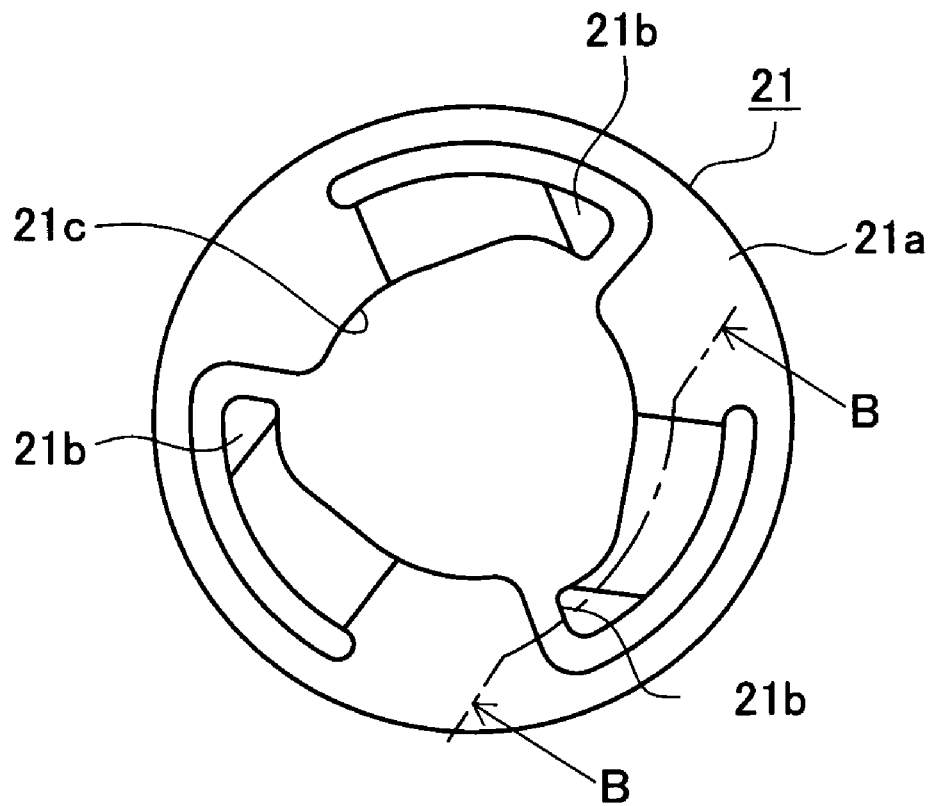
FIG. 8 is a plan view of an elastic body in a third embodiment.
Figure 9:
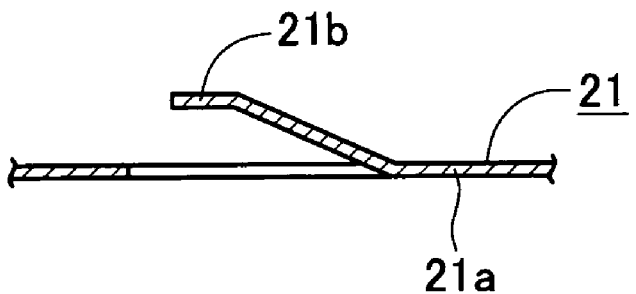
FIG. 9 is a sectional view taken along a line B-B of FIG. 8.

The present embodiment differs in the structure of an elastic body 21 from the first embodiment. FIG. 8 is a plan view of this elastic body 21. FIG. 9 is a sectional view taken along a line B-B of FIG. 8. In the present embodiment, differently from the elastic body 20 in the first embodiment, the elastic body 21 is of a shape that an inner part adjacent to each tongue-shaped piece including a tab 21b is partly cut out, with partial absence of an edge of a central opening 21c of the elastic body 21. In the present embodiment, similarly, a bend of each tab 21b is formed as a round corner, which is supported on the case 5a so that each tab 21b is in contact with the case 5a at that round corner and the leading end of each tab 21b is maintained out of contact with the case 5a. This makes it possible to prevent each tab 21b from scratching the case 5a, allowing each tab 21b to smoothly slide thereon.

According to the present embodiment, differently from the first embodiment, a press die for use in press working for producing the elastic body 21 can be simplified in structure. Thus, the elastic body 21 can be produced at lower cost by just that much. Other operations and effects in the present embodiment are basically the same those in the first embodiment.

Fourth Embodiment

A fourth embodiment of the electronically controlled throttle valve system of the present invention will be described referring to the accompanying drawings.

Figure 10:
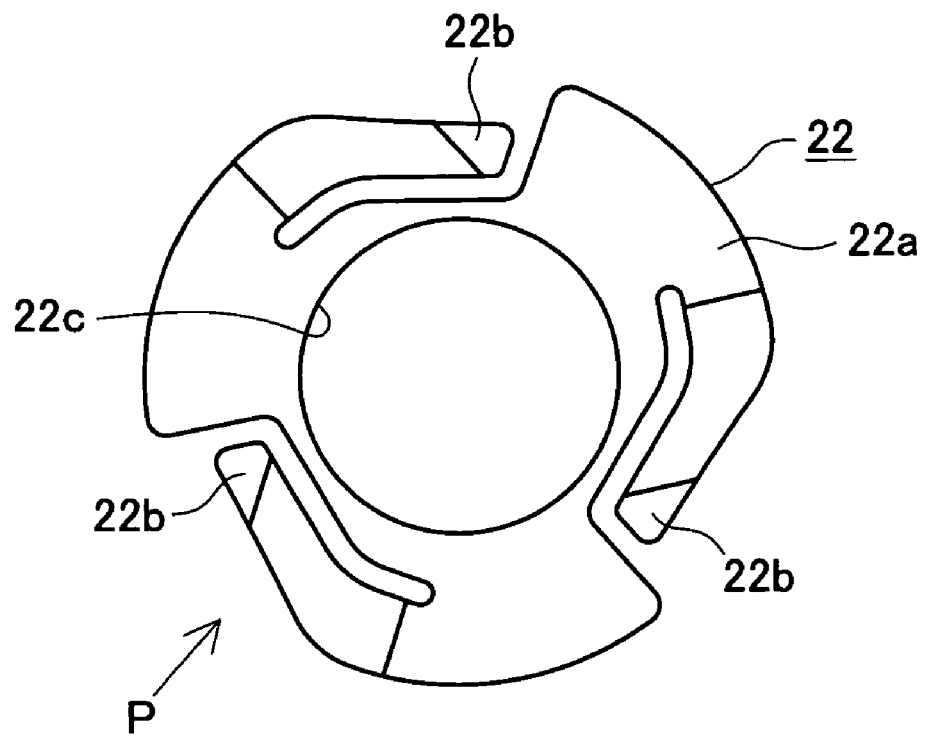
FIG. 10 is plan view of an elastic body in a fourth embodiment.
Figure 11:
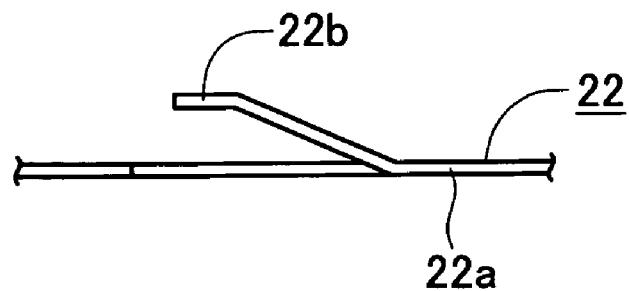
FIG. 11 is a side view of the elastic body of FIG. 10, seen from a direction as indicated by an arrow P.

The present embodiment differs in the structure of an elastic body 22 from those in the first and third embodiments. FIG. 10 is a plan view of the elastic body 22. FIG. 11 is a side view of the elastic body 22 seen from the side indicated by an arrow P. In the present embodiment, differently from the elastic body 20 in the first embodiment, the elastic body 22 is of a shape that an outer part of a plate spring base part 22a adjacent to each tongue-shaped piece including a tab 21b is partly cut out, with partial absence of an outer peripheral edge of the elastic body 22. Furthermore, the plate spring base part 22a includes a central opening 22c. In the present embodiment, similarly, a bend of each tab 22b is formed as a round corner, which makes contact with the case 5a so that each tab 22b is supported on the case 5a at that round corner and the leading end of each tab 22b is maintained out of contact with the case 5a. This makes it possible to prevent each tab 22b from scratching the case 5a, allowing each tab 22b to smoothly slide thereon.

According to the present embodiment, differently from the first embodiment, a press die for use in press working for producing the elastic body 22 can be simplified in structure. Thus, the elastic body 22 can be produced at lower cost by just that much. Other operations and effects in the present embodiment are basically the same those in the first embodiment.

Fifth Embodiment

A fifth embodiment of the electronically controlled throttle valve system of the present invention will be described referring to the accompanying drawings.

Figure 12:
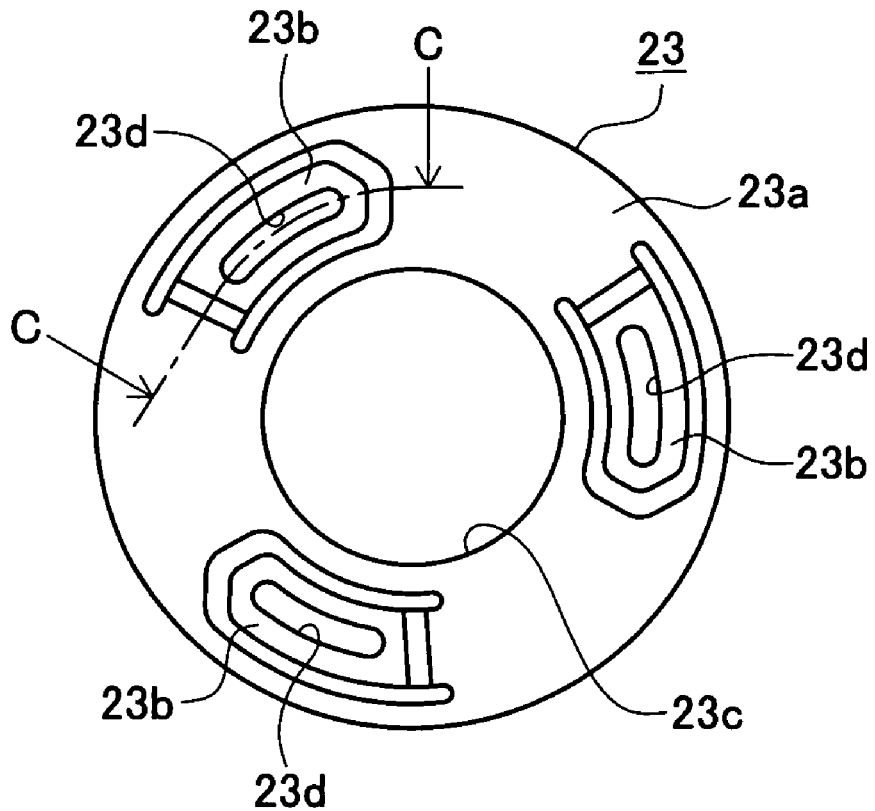
FIG. 12 is a plan view of an elastic body in a fifth embodiment.
Figure 13:
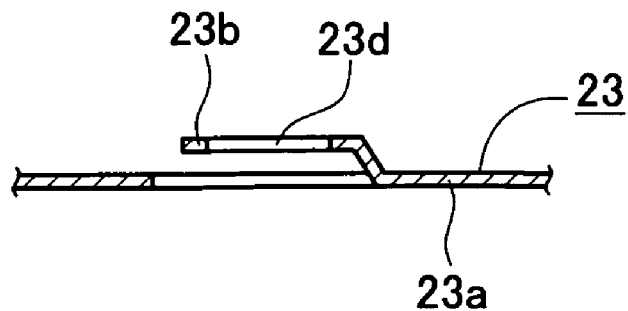
FIG. 13 is a sectional view taken along a line C-C of FIG. 12.

The present embodiment differs in the structure of an elastic body 23 from the first embodiment. FIG. 12 is a plan view of the elastic body 23. FIG. 13 is a sectional view taken along a line C-C of FIG. 12. In the present embodiment, differently from the elastic body 21 in the first embodiment, a major portion of each tongue-shaped piece constitutes a tab 23b. Each tab 23b is designed to have a large width and length and formed with a central slit 23d longitudinally extending along each tab 23b. The plate spring base part 23a further includes a central opening 23c.

According to the present embodiment, as compared with the first embodiment, each tab 23b can make contact in a wider area with a contacted portion of a relevant component by such larger width and length of each tab 23b. This makes it possible to stably hold the elastic body 23 in contact with the contacted portions. Other operations and effects in the present embodiment are basically the same those in the first embodiment.

Sixth Embodiment

A sixth embodiment of the electronically controlled throttle valve system of the present invention will be described referring to the accompanying drawings.

Figure 14:
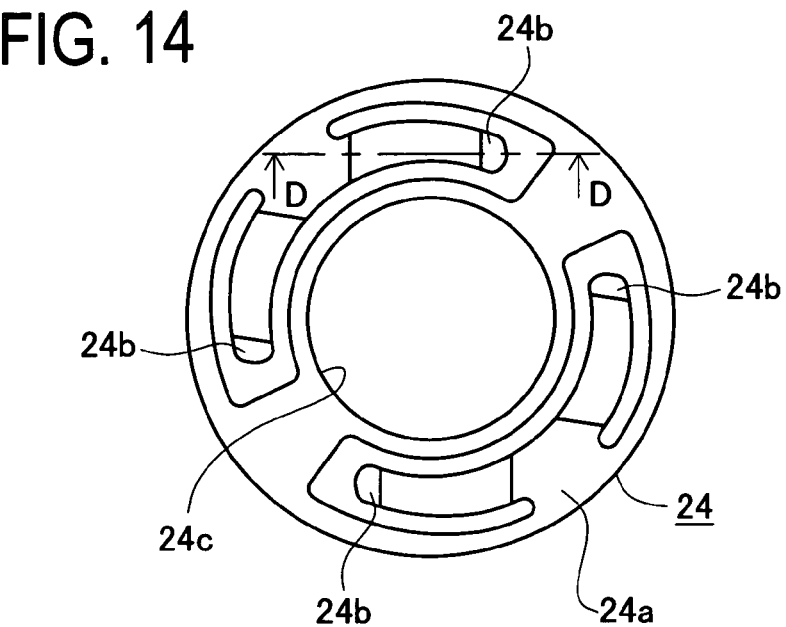
FIG. 14 is a plan view of an elastic body in a sixth embodiment.

The present embodiment differs in the structure of an elastic body 24 from the first embodiment. FIG. 14 is a plan view of the elastic body 24. A sectional view taken along a line D-D of FIG. 14 is identical to FIG. 6 in the first embodiment and therefore omitted herein. In the present embodiment, differently from the elastic body 20 in the first embodiment, four tongue-shaped pieces each including a tab 24b are arranged so that adjacent two of the tabs 24b are oriented in opposite circumferential directions. Further, a plate spring base part 24a includes a central opening 24c.

In the first embodiment that the tabs 20a are oriented in the same circumferential direction, the tabs 20a will warp in the same circumferential direction when the elastic body 20 is mounted between the valve housing 9 and the DC motor 5, which may cause rotation of the elastic body 20, resulting in displacement thereof. In the present embodiment, on the other hand, the adjacent tabs 24b are oriented in opposite circumferential directions to each other, so that those tabs 24b will warp in the mutually opposite circumferential directions. Thus, the normal and reverse rotations of the elastic body 24 balance each other out, thereby preventing rotational displacement of the elastic body 24. Other operations and effects in the present embodiment are basically the same those in the first embodiment.

Seventh Embodiment

A seventh embodiment of the electronically controlled throttle valve system of the present invention will be described referring to the accompanying drawings.

Figure 15:
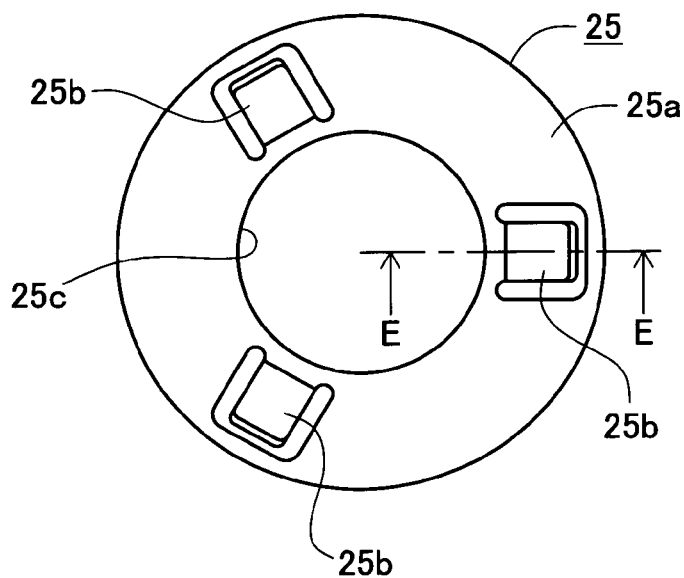
FIG. 15 is a plan view of an elastic body in a seventh embodiment.
Figure 16:
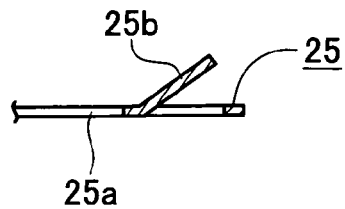
FIG. 16 is a sectional view taken along a line E-E of FIG. 15.

The present embodiment differs in the structure of an elastic body 25 from the first, and third through sixth embodiments. FIG. 15 is a plan view of the elastic body 25. FIG. 16 is a sectional view taken along a line E-E of FIG. 15. In the present embodiment, a major portion of each tongue-shaped piece constitutes a tab 25b, differently from the elastic bodies 20 to 24 in the first and third through sixth embodiments. Each tab 25b is designed to have an end orientated outward in a radial direction of the elastic body 25. In the present embodiment, three tabs 25b are provided. Further, the number of tabs 25b may be increased as needed in a range so that the area of a plate spring base part 25a does not become too small. Further, the plate spring base part 25a includes a central opening 25c.

In the present embodiment, consequently, the leading end of each tab 25b will warp as oriented radially outwardly. This will not cause torque of the elastic body 25 in the circumferential direction, thus preventing rotational displacement of the elastic body 25. Other operations and effects in the present embodiment are basically the same those in the first embodiment.

Eighth Embodiment

An eighth embodiment of the electronically controlled throttle valve system of the present invention will be described referring to the accompanying drawings.

Figure 17:
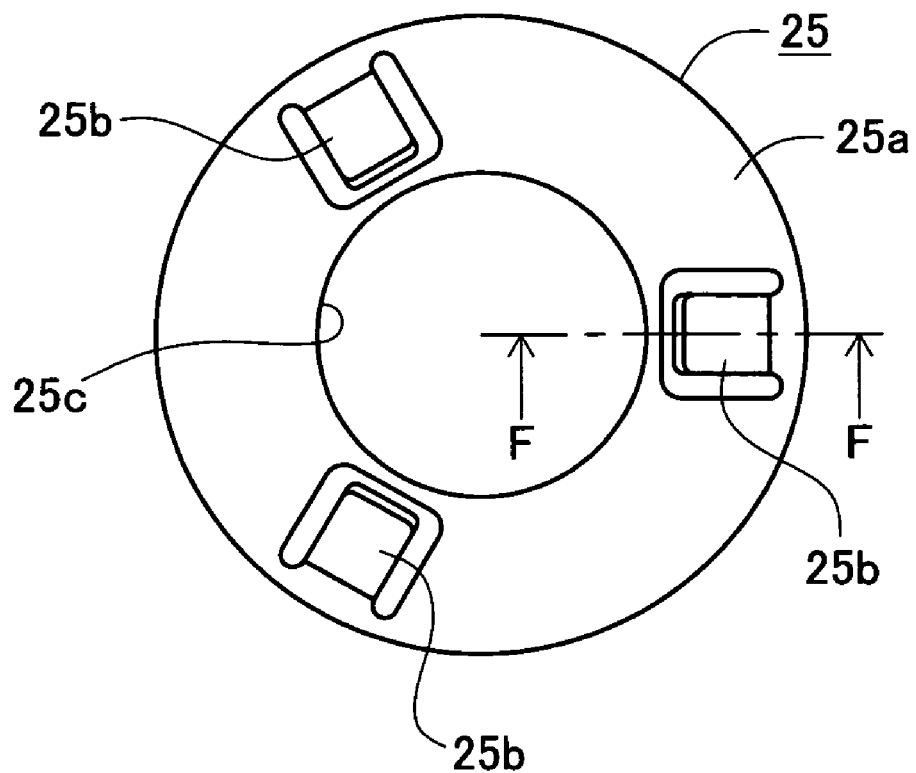
FIG. 17 is a plan view of an elastic body in an eighth embodiment.
Figure 18:
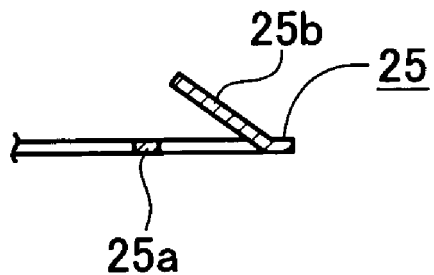
FIG. 18 is a sectional view taken along a line F-F of FIG. 17.

The present embodiment differs in the orientation of each tab 25b of an elastic body 25 from the seventh embodiment; that is, opposite to the orientation of each tab 25b in the seventh embodiment. FIG. 17 is a plan view of the elastic body 25. FIG. 18 is a sectional view taken along a line F-F of FIG. 17. In the present embodiment, each tab 25b is designed to have an end oriented inward in a radial direction of the elastic body 25.

In the present embodiment, accordingly, the leading end of each tab 25b will warp as oriented radially inwardly. This will not cause torque of the elastic body 25 in the circumferential direction, thus preventing rotational displacement of the elastic body 25. Other operations and effects in the present embodiment are basically the same those in the first embodiment.

Ninth Embodiment

A ninth embodiment of the electronically controlled throttle valve system of the present invention will be described referring to the accompanying drawings.

Figure 19:
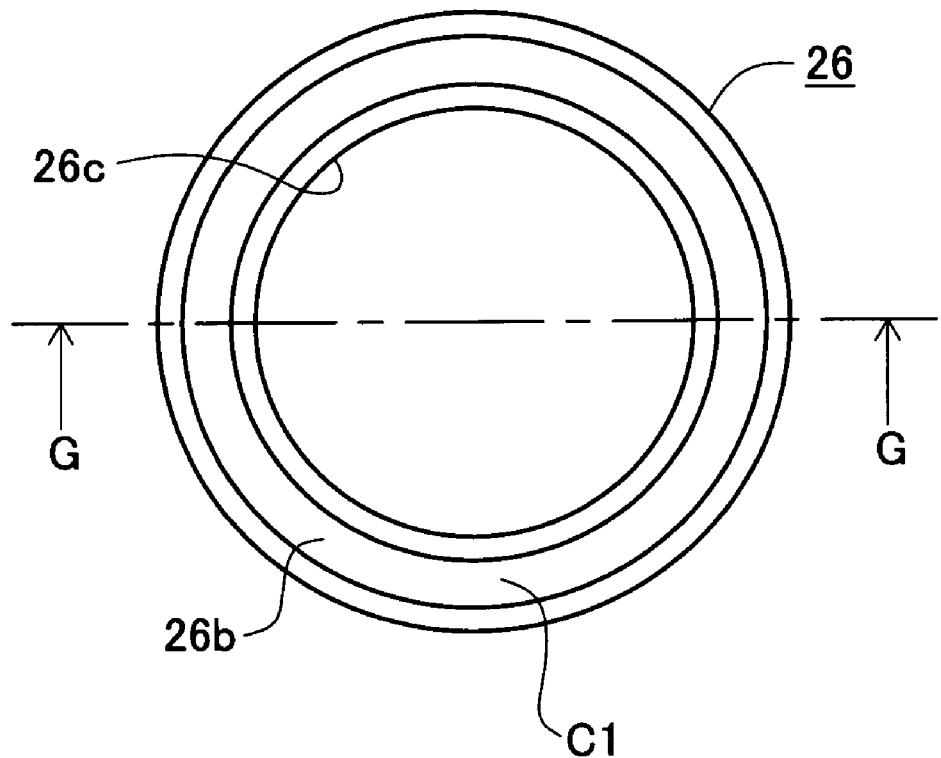
FIG. 19 is a plan view of an elastic body in a ninth embodiment.
Figure 20:
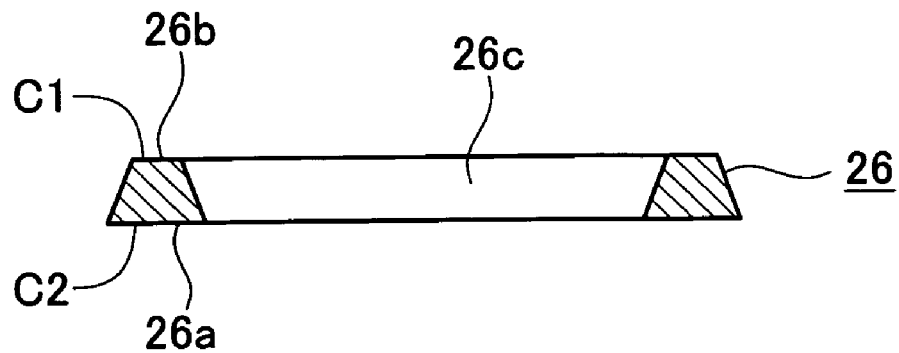
FIG. 20 is a sectional view taken along a line G-G of FIG. 19.

The present embodiment differs in the structure of an elastic body from the aforementioned embodiments. FIG. 19 is a plan view of the elastic body 26. FIG. 20 is a sectional view taken along a line G-G of FIG. 19. In the present embodiment, the elastic body 26 is made of an annular rubber material. This elastic body 26 is of a trapezoidal shape in section as shown in FIG. 20, including annular bearing surfaces 26a and 26b as an upper and a lower end faces respectively. The second annular bearing surface 26a as the lower end face is wider in width than the first annular bearing surface 26b as the upper end face. The wider, second annular bearing surface 26a constitutes the second contact portion C2 having a larger contact area. The narrower, first annular bearing surface 26b constitutes the first contact portion C1 having a smaller contact area. The elastic body 26 further includes a central opening 26c. In the present embodiment, the size of the elastic body 26 when mounted in the system may change depending on hardness and a deforming amount of the rubber material. Accordingly, appropriate setting of such hardness and the deforming amount of the rubber material makes it possible to adjust a difference in area between the annular bearing surfaces 26a and 26b.

In the case where the elastic body 26 in the present embodiment is used in the throttle valve system 1 in the first embodiment, the elastic body 26 is placed so that the second annular bearing surface 26a having a larger contact area than the first annular bearing surface 26b is in contact with the valve housing 9 made of resin which is a material easy to be deformed while the first annular bearing surface 26b having a smaller contact area is in contact with the case 5a made of metal which is a material hard to be deformed. Accordingly, the first annular bearing surface 26b having a smaller contact area exerts larger contact pressure on a contacted portion of the case 5a, compared with second annular bearing surface 26a having a larger contact are. However, since the contacted portion is part of the metal case 5a hard to be deformed, its deformation can be prevented. On the other hand, the second annular bearing surface 26a having a larger contact area exerts smaller contact pressure on the valve housing 9, compared with the first annular bearing surface 26b having a smaller contact area. Accordingly, although a contacted portion is part of the resin valve housing 9 easy to be deformed, its deformation can be prevented. The elastic body 26 mounted between the DC motor 5 and the throttle body 2 can prevent the occurrence of creep deformation of the resin valve housing 9.

In the present embodiment, furthermore, the elastic body 26 is overall made of a rubber material, so that such elastic body 26 can be integrally mold by injection molding of the rubber material. Thus, the elastic body 26 can be produced at lower cost as compared with the plate spring produced by press working.

Tenth Embodiment

A tenth embodiment of the electronically controlled throttle valve system of the present invention will be described referring to the accompanying drawings.

Figure 21:
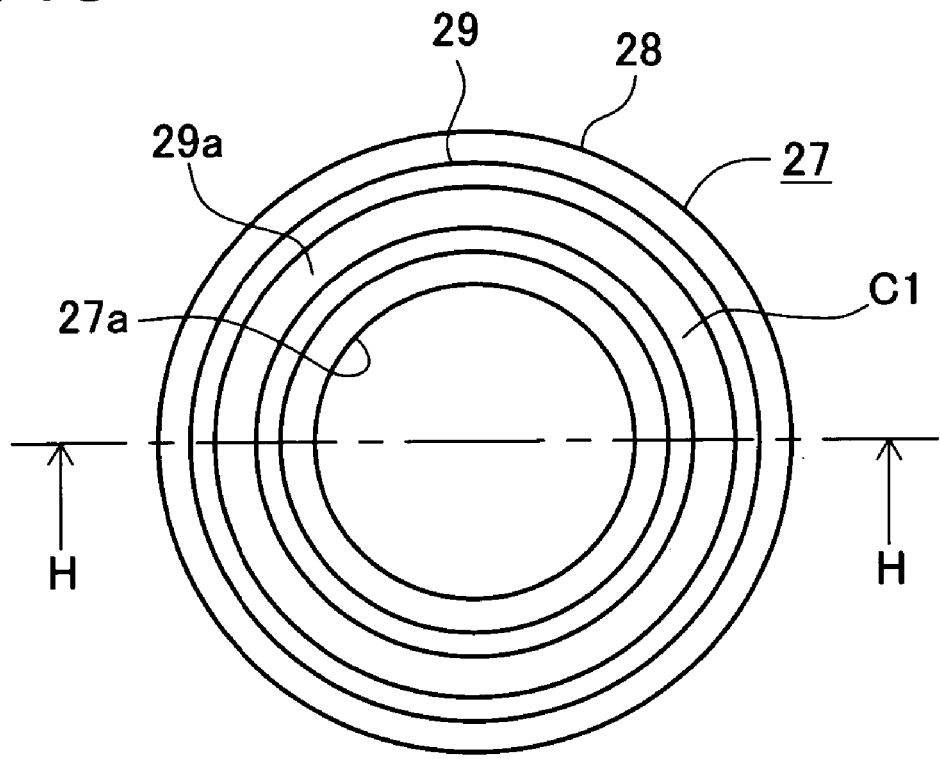
FIG. 21 is a plan view of an elastic body in a tenth embodiment.
Figure 22:
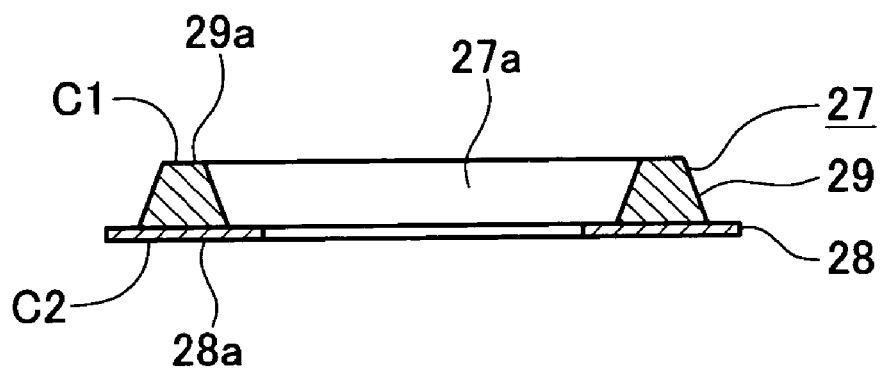
FIG. 22 is a sectional view taken along a line H-H of FIG. 21.

The present embodiment differs in the structure of an elastic body 27 from the aforementioned embodiments. FIG. 21 is a plan view of the elastic body 27. FIG. 22 is a sectional view taken along a line H-H of FIG. 21. In the present embodiment, the elastic body 27 is made of an annular rubber member 29 bonded on an annular metal plate 28. As shown in FIGS. 21 and 22, the metal plate 28 is larger in diameter and width than the rubber member 29. The rubber member 29 is of a trapezoidal shape in section as shown in FIG. 22. The lower surface of the metal plate 28 constitutes the second contact portion C2 having a larger contact area and the upper surface of the rubber member 29 constitutes the first contact portion C1 having a smaller contact area. In other words, in the elastic body 27, a wider, first annular bearing surface 28a of the metal plate 28 serves as the second contact portion C2 having a larger contact area and a narrower, second annular bearing surface 29a serves as the first contact portion C1 having a smaller contact area. The elastic body 27 further includes a central opening 27a. In the present embodiment, similarly, the size of the rubber member 29 when mounted in the system may change depending on hardness and a deforming amount of the rubber member 29. Accordingly, appropriate setting of such hardness and the deforming amount of the rubber member 29 makes it possible to adjust the area of the second annular bearing surface 29a.

In the case where the elastic body 27 in the present embodiment is mounted in the throttle valve system 1 in the first embodiment, of the first and second annular bearing surfaces 28a and 29a of the elastic body 27, the first annular bearing surface 28a having a larger contact area is in contact with the valve housing 9 made of resin which is a material easy to be deformed while the second annular bearing surface 29a having a smaller contact area is in contact with the case 5a made of metal which is a material hard to be deformed. Accordingly, the similar operations and effects to in the ninth embodiment can be obtained.

In the present embodiment, furthermore, the first annular bearing surface 28a having a larger contact area is provided in the metal plate 28. The contact pressure the first annular bearing surface 28a exerts on the housing 9 is more uniform and smaller than the elastic body 26 in the ninth embodiment. In the present embodiment, therefore, the effect of preventing the occurrence of creep deformation of the housing 9 can be more enhanced than in the ninth embodiment.

Eleventh Embodiment

An eleventh embodiment of the electronically controlled throttle valve system of the present invention will be described referring to the accompanying drawings.

Figure 23:
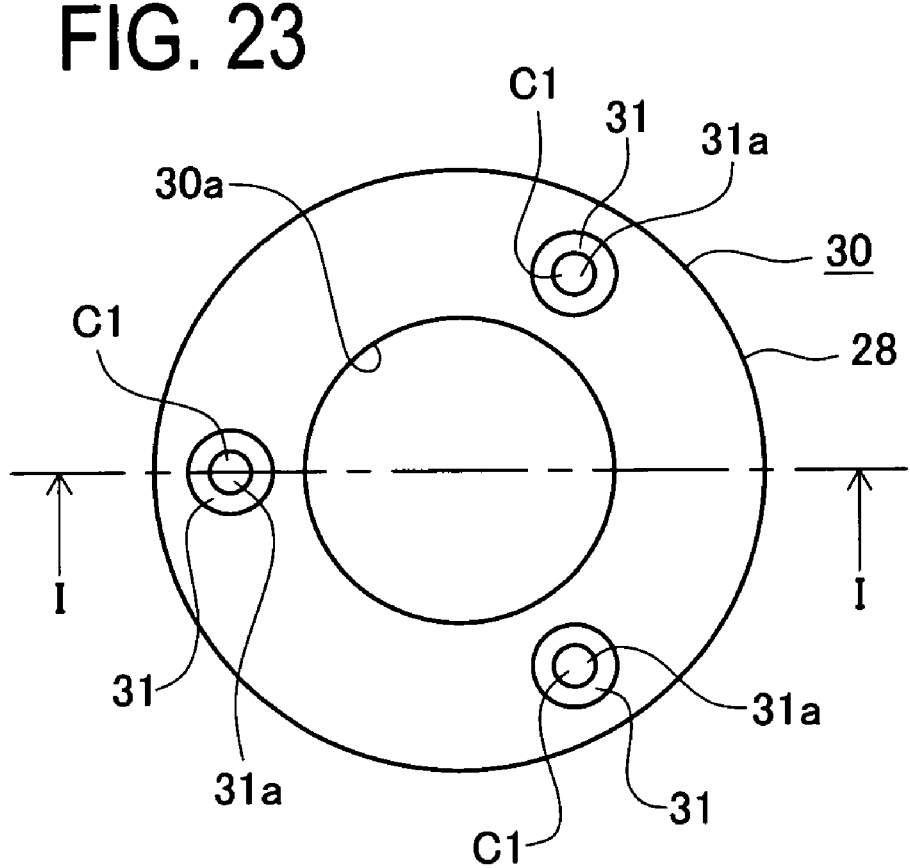
FIG. 23 is a plan view of an elastic body in an eleventh embodiment.
Figure 24:
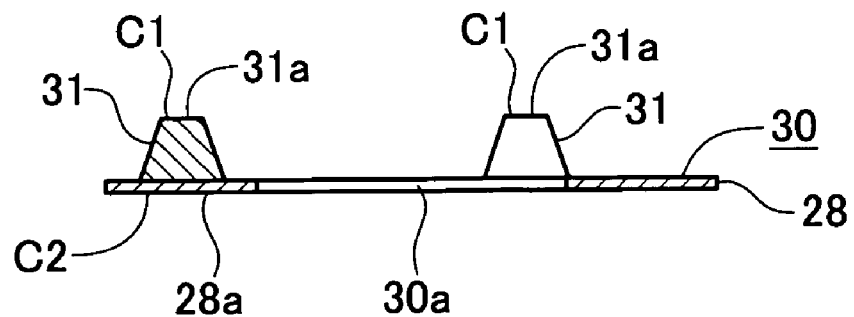
FIG. 24 is a sectional view taken along a line I-I of FIG. 23.

The present embodiment differs in the structure of an elastic body 30 from the tenth embodiment. FIG. 23 is a plan view of the elastic body 30. FIG. 24 is a sectional view taken along a line I-I of FIG. 23. In the present embodiment, the elastic body 30 is formed of a plurality of small rubber pieces 31 bonded on the upper surface of an annular metal plate 28. As shown in FIGS. 23 and 24, each rubber piece 31 is of a truncated cone shape. The rubber pieces 31 are arranged on the upper surface of the annular metal plate 28 at circumferentially regular intervals. The width of the metal plate 28 is larger than the outer diameter of each rubber piece 31. The lower surface of the metal plate 28 constitutes the second contact portion C2 having a larger contact area and the upper surface of each rubber piece 31 constitutes the first contact portion C1 having a smaller contact area. In other words, in the elastic body 30, a first annular bearing surface 28a of the wider metal plate 28 constitutes the second contact portion C2 having a larger contact area and each end face 31a of the plurality of rubber pieces 31 constitutes the first contact portion C1 having a smaller contact area. The elastic body 30 further includes a central opening 30a. In the present embodiment, similarly, the size of each rubber piece 31 may change depending on hardness and a deforming amount of the rubber piece 31. Accordingly, appropriate setting of such hardness and the deforming amount of the rubber piece 31 makes it possible to adjust the area of each end face 31a.

In the case where the elastic body 30 in the present embodiment is mounted in the throttle valve system 1 in the first embodiment, of the first annular bearing surface 28a of the metal plate 28 and the end faces 31a of the rubber pieces 31, the first annular bearing surface 28a having a larger contact area is in contact with the valve housing 9 made of resin which is a material easy to be deformed while the end face 31a of each rubber piece 31 having a smaller contact area is in contact with the case 5a made of metal which is a material hard to be deformed. Accordingly, the similar operations and effects to in the tenth embodiment can be obtained.

In the present embodiment, furthermore, each rubber piece 31 having a smaller contact area is shaped in protruding form from the metal plate 28. As compared with the elastic body 27 in the tenth embodiment, each rubber piece 31 can be deformed more easily. Thus, the elastic body 30 can readily cover the tolerance of size of the DC motor 5 and the throttle body 2.

The present invention may be embodied in other specific forms without departing from the spirit or essential characteristics thereof.

For instance, in each of the above mentioned embodiments, the DC motor 5 is used as the actuator of the present invention. Instead thereof, a step motor or other electric motors may be adopted.

In the first through eighth embodiments, the elastic bodies 20, 21, 22, 23, 24, and 25 are provided with the plurality of tabs 20b, 21b, 22b, 23b, 24b, and 25b respectively. Alternatively, the elastic body may be provided with a single tab.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An electronically controlled throttle valve system comprising:
   a throttle valve;
   an actuator for actuating the throttle valve and which includes a case,
   a throttle body which houses and supports the throttle valve and the actuator,
   the case of the actuator and the throttle body being made of mutually different materials; and
   an elastic body mounted between the case of the actuator and the throttle body;
   wherein the elastic body includes a contact portion which is in contact with the case of the actuator and another contact portion which is in contact with the throttle body,
   one of the contact portions is larger in contact area than the other one, and
   the contact portion having a larger contact area is in contact with one of the case and the throttle body, which is made of a material easy to be deformed, and the other contact portion having a smaller contact area is in contact with the other one of the case and the throttle body, which is made of a material hard to be deformed.

2. The electronically controlled throttle valve system according to claim 1, wherein
   the elastic body is formed of a nearly annular plate spring including a central opening,
   the contact portion having the larger contact area is formed of a nearly annular plate spring base part, and
   the contact portion having the smaller contact area is formed of a tab which is part of the plate spring, bent in a tongue-like shape.

3. The electronically controlled throttle valve system according to claim 2, wherein the elastic body includes a plurality of the tabs, each tab being provided as an angular tip part of a tongue-shaped piece which is left inside of a nearly U-shaped cutout portion of the plate spring and which is bent to protrude upward from a surface of the plate spring base part and have the angular tip part, and
   the plurality of tabs are arranged so that respective leading ends are oriented in the same circumferential direction.

4. The electronically controlled throttle valve system according to claim 2, wherein the elastic body includes a plurality of the tabs, each tab being provided as an angular tip part of a tongue-shaped piece which is left inside of a nearly U-shaped cutout portion of the plate spring and which is bent to protrude upward from a surface of the plate spring base part and have the angular tip part,
   the plurality of tabs are arranged so that respective leading ends are oriented in the same circumferential direction, and
   an inner part of the plate spring base part adjacent to each tongue-shaped piece is partly cut out, with partial absence of an edge of the central opening.

5. The electronically controlled throttle valve system according to claim 2, wherein the elastic body includes a plurality of the tabs, each tab being provided as an angular tip part of a tongue-shaped piece which is left inside of a nearly U-shaped cutout portion of the plate spring and which is bent to protrude upward from a surface of the plate spring base part and have the angular tip part, and
   the plurality of tabs are arranged so that respective leading ends are oriented in the same circumferential direction, and
   an outer part of the plate spring base part adjacent to each tongue-shaped piece is partly cut out, with partial absence of an outer peripheral edge of the plate spring.

6. The electronically controlled throttle valve system according to claim 2, wherein the elastic body includes a plurality of the tabs, each tab being provided as an angular tip part of a tongue-shaped piece which is left inside of a nearly U-shaped cutout portion of the plate spring and which is bent to protrude upward from a surface of the plate spring base part and have the angular tip part,
   each tab is formed with a central slit longitudinally extending along the tab, and
   the plurality of tabs are arranged so that respective leading ends are oriented in the same circumferential direction.

7. The electronically controlled throttle valve system according to claim 2, wherein the elastic body includes four tabs, each tab being provided as an angular tip part of a tongue-shaped piece which is left inside of a nearly U-shaped cutout portion of the plate spring and which is bent to protrude upward from a surface of the plate spring base part and have the angular tip part, and
   the four tabs are arranged so that adjacent two of them are oriented in an opposite circumferential direction.

8. The electronically controlled throttle valve system according to claim 2, wherein the elastic body includes a plurality of the tabs, each tab being provided as a tongue-shaped piece which is left inside of a nearly U-shaped cutout portion of the plate spring and which is bent to protrude upward from a surface of the plate spring base part, and
   a leading end of each tab is oriented outwardly in a radial direction of the elastic body.

9. The electronically controlled throttle valve system according to claim 2, wherein the elastic body includes a plurality of the tabs, each tab being provided as a tongue-shaped piece which is left inside of a nearly U-shaped cutout portion of the plate spring and which is bent to protrude upward from a surface of the plate spring base part, and
   a leading end of each tab is oriented inwardly in a radial direction of the elastic body.

10. The electronically controlled throttle valve system according to claim 1, wherein the elastic body is formed of an annular rubber member including annular bearing surfaces as an upper and lower end faces having different widths, and the wider annular bearing surface constitutes the contact portion having the larger contact area and the narrower annular bearing surface constitutes the contact portion having the smaller contact area.

11. The electronically controlled throttle valve system according to claim 1, wherein the elastic body is formed of an annular metal plate and a rubber member bonded on the metal plate, and
    an annular bearing surface of the metal plate constitutes the contact portion having the larger contact area and an end face of the rubber member constitutes the contact portion having the smaller contact area.

12. The electronically controlled throttle valve system according to claim 1, wherein the elastic body is formed of an annular metal plate and an annular rubber member bonded on the metal plate,
    the rubber member is of a smaller diameter than the metal plate, and
    an annular bearing surface of the metal plate constitutes the contact portion having the larger contact area and an annular bearing surface of the rubber member constitutes the contact portion having the smaller contact area.

13. The electronically controlled throttle valve system according to claim 1, wherein the elastic body is formed of an annular metal plate and a plurality of small rubber pieces bonded on the metal plate, the rubber pieces are each shaped like a truncated cone and arranged on an upper surface of the annular metal plate at circumferentially regular intervals, and an annular bearing surface of the metal plate constitutes the contact portion having the larger contact area and each top face of the rubber pieces constitutes the contact portion having the smaller contact area.

14. An electronically controlled throttle valve system comprising:

a throttle valve;

an actuator for actuating the throttle valve and which includes a case;

a throttle body which houses and supports the throttle valve and the actuator; and an elastic body mounted between the case of the actuator and the throttle body;

wherein the elastic body includes a contact portion which is in contact with the case of the actuator and another contact portion which is in contact with the throttle body, one of the contact portions is larger in contact area than the other one, the contact portion having a larger contact area is in contact with one of the case and the throttle body, which is formed in a shape easy to be deformed, and the other contact portion having a smaller contact area is in contact with the other one of the case and the throttle body, which is formed in a shape hard to be deformed.

15. The electronically controlled throttle valve system according to claim 14, wherein the elastic body is formed of a nearly annular plate spring including a central opening, the contact portion having the larger contact area is formed of a nearly annular plate spring base part, and the contact portion having the smaller contact area is formed of a tab which is part of the plate spring, bent in a tongue-like shape.

16. The electronically controlled throttle valve system according to claim 15, wherein the elastic body includes a plurality of the tabs, each tab being provided as an angular tip part of a tongue-shaped piece which is left inside of a nearly U-shaped cutout portion of the plate spring and which is bent to protrude upward from a surface of the plate spring base part and have the angular tip part, and the plurality of tabs are arranged so that respective leading ends are oriented in the same circumferential direction.

17. The electronically controlled throttle valve system according to claim 15, wherein the elastic body includes a plurality of the tabs, each tab being provided as an angular tip part of a tongue-shaped piece which is left inside of a nearly U-shaped cutout portion of the plate spring and which is bent to protrude upward from a surface of the plate spring base part and have the angular tip part, the plurality of tabs are arranged so that respective leading ends are oriented in the same circumferential direction, and an inner part of the plate spring base part adjacent to each tongue-shaped piece is partly cut out, with partial absence of an edge of the central opening.

18. The electronically controlled throttle valve system according to claim 15, wherein the elastic body includes a plurality of the tabs, each tab being provided as an angular tip part of a tongue-shaped piece which is left inside of a nearly U-shaped cutout portion of the plate spring and which is bent to protrude upward from a surface of the plate spring base part and have the angular tip part, and the plurality of tabs are arranged so that respective leading ends are oriented in the same circumferential direction, and an outer part of the plate spring base part adjacent to each tongue-shaped piece is partly cut out, with partial absence of an outer peripheral edge of the plate spring.

19. The electronically controlled throttle valve system according to claim 15, wherein the elastic body includes a plurality of the tabs, each tab being provided as an angular tip part of a tongue-shaped piece which is left inside of a nearly U-shaped cutout portion of the plate spring and which is bent to protrude upward from a surface of the plate spring base part and have the angular tip part, each tab is formed with a central slit longitudinally extending along the tab, and the plurality of tabs are arranged so that respective leading ends are oriented in the same circumferential direction.

20. The electronically controlled throttle valve system according to claim 15, wherein the elastic body includes four tabs, each tab being provided as an angular tip part of a tongue-shaped piece which is left inside of a nearly U-shaped cutout portion of the plate spring and which is bent to protrude upward from a surface of the plate spring base part and have the angular tip part, and the four tabs are arranged so that adjacent two of them are oriented in an opposite circumferential direction.

21. The electronically controlled throttle valve system according to claim 15, wherein the elastic body includes a plurality of the tabs, each tab being provided as a tongue-shaped piece which is left inside of a nearly U-shaped cutout portion of the plate spring and which is bent to protrude upward from a surface of the plate spring base part, and a leading end of each tab is oriented outwardly in a radial direction of the elastic body.

22. The electronically controlled throttle valve system according to claim 15, wherein the elastic body includes a plurality of the tabs, each tab being provided as a tongue-shaped piece which is left inside of a nearly U-shaped cutout portion of the plate spring and which is bent to protrude upward from a surface of the plate spring base part, and a leading end of each tab is oriented inwardly in a radial direction of the elastic body.

23. The electronically controlled throttle valve system according to claim 14, wherein the elastic body is formed of an annular rubber member including annular bearing surfaces as an upper and lower end faces having different widths, and the wider annular bearing surface constitutes the contact portion having the larger contact area and the narrower annular bearing surface constitutes the contact portion having the smaller contact area.

24. The electronically controlled throttle valve system according to claim 14, wherein the elastic body is formed of an annular metal plate and a rubber member bonded on the metal plate, and an annular bearing surface of the metal plate constitutes the contact portion having the larger contact area and an end face of the rubber member constitutes the contact portion having the smaller contact area.

25. The electronically controlled throttle valve system according to claim 14, wherein the elastic body is formed of an annular metal plate and an annular rubber member bonded on the metal plate, the rubber member is of a smaller diameter than the metal plate, and an annular bearing surface of the metal plate constitutes the contact portion having the larger contact area and an annular bearing surface of the rubber member constitutes the contact portion having the smaller contact area.

26. The electronically controlled throttle valve system according to claim 14, wherein the elastic body is formed of an annular metal plate and a plurality of small rubber pieces bonded on the metal plate, the rubber pieces are each shaped like a truncated cone and arranged on an upper surface of the annular metal plate at circumferentially regular intervals, and an annular bearing surface of the metal plate constitutes the contact portion having the larger contact area and each top face of the rubber pieces constitutes the contact portion having the smaller contact area.

* * * * *